May 8, 1956 R. E. BUSCH ET AL 2,744,682
ACCUMULATOR ENGAGING MECHANISM
Filed Feb. 2, 1953 10 Sheets-Sheet 1

FIG.1

INVENTORS,
Richard E. Busch,
Donald F. O'Connor &
Milton V. Scozzafava

ATTORNEY.

May 8, 1956

R. E. BUSCH ET AL 2,744,682

ACCUMULATOR ENGAGING MECHANISM

Filed Feb. 2, 1953

INVENTORS,
Richard E. Busch,
Donald F. O'Connor
& Milton V. Scozzafava

*Fred N. Schwend*
ATTORNEY.

May 8, 1956

R. E. BUSCH ET AL 2,744,682

ACCUMULATOR ENGAGING MECHANISM

Filed Feb. 2, 1953

INVENTORS,
Richard E. Busch,
Donald F. O'Connor &
Milton V. Scozzafava

ATTORNEY.

May 8, 1956 R. E. BUSCH ET AL 2,744,682
ACCUMULATOR ENGAGING MECHANISM
Filed Feb. 2, 1953 10 Sheets-Sheet 5

INVENTORS
Richard E. Busch,
Donald F. O'Conner, &
Milton V. Scozzafava

ATTORNEY.

May 8, 1956

R. E. BUSCH ET AL 2,744,682

ACCUMULATOR ENGAGING MECHANISM

Filed Feb. 2, 1953

INVENTORS,
Richard F. Busch,
Donald F. O'Connor &
Milton V. Scozzafava

ATTORNEY.

May 8, 1956  R. E. BUSCH ET AL  2,744,682
ACCUMULATOR ENGAGING MECHANISM
Filed Feb. 2, 1953  10 Sheets-Sheet 7

INVENTORS,
Richard E. Busch,
Donald F. O'Connor
& Milton V. Scozzafava

ATTORNEY.

May 8, 1956

R. E. BUSCH ET AL 2,744,682

ACCUMULATOR ENGAGING MECHANISM

Filed Feb. 2, 1953

INVENTORS,
Richard E. Busch,
Donald F. O'Connor &
Milton V. Scozzafava

Fred N. Schwend
ATTORNEY.

United States Patent Office 2,744,682
Patented May 8, 1956

2,744,682
ACCUMULATOR ENGAGING MECHANISM

Richard E. Busch, North Hollywood, Donald F. O'Connor, San Gabriel, and Milton V. Scozzafava, Temple City, Calif., assignors to Clary Corporation, a corporation of California Application February 2, 1953, Serial No. 334,632

12 Claims. (Cl. 235—60)

This invention relates to calculating machines and has particular reference to machines commonly known as adding-listing machines which are capable of adding and subtracting and recording the factors and results of such calculations. However, it is to be understood that at least certain aspects of the invention may be applicable to other types of business machines.

A principal object of the invention is to provide an improved mechanism for selectively causing differential actuators to drive an accumulator in different manners in accordance with a calculation to be performed.

Another object is to provide an accumulator engaging mechanism for positively moving an accumulator into and out of different relations relative to differential actuators therefor.

The manner in which the above and other objects of the invention are accomplished will be readily understood upon reference to the following specification when read in conjunction with the accompanying drawings wherein.

General arrangement

The invention is disclosed as embodied in a hand driven adding-listing machine, and although particularly applicable to this form of machine, at least certain salient features are equally well applicable to other forms of machines, either hand or motor driven.

The machine comprises a keyboard, embodying a plurality of rows of amount keys 11 progressing in value from 1 to 9. The machine is normally set to effect additive entries of amounts set up on the keyboard, and this is accomplished by merely oscillating a drive handle 12. Subtractive entries are effected by entering amounts in the keyboard, depressing a settable subtract key 13, and thereafter oscillating the handle 12. Repeat operations are effected by depressing a settable repeat bar 14 and thereafter oscillating the handle 12 to enter amounts set up on the keyboard. The repeat bar will remain in set position to effect repeated entries of amounts until released by depression of another control key, or a clear key 15. The latter is effective to first release any depressed control key during partial depression thereof and is effective upon further depression to release all depressed amount keys. Repeat subtract entries are effected by concomitantly setting both the repeat key and the subtract key.

Totalling and subtotalling operations are effected by presenting total and subtotal keys 16 and 17, respectively, and thereafter operating the handle 12.

Amounts entered in the keyboard are transferred by drive racks 18 (Fig. 2) to an accumulator, generally indicated at 20, and a printer mechanism indicated at 21, whereby to accumulate such amounts and concurrently print the same on a paper tape 22 which is advanced step by step by a platen 23. The racks 18 are also effective during totalling and subtotalling operations to transfer amounts registered in the accumulator 20 to the printer mechanism whereby to print totals.

Keyboard

The keyboard is of the flexible type in that each key when depressed is effective to release a previously depressed key in the same row. Each amount key of the keyboard (Figs. 2 and 4) comprises a key top 24 and a key stem 25, the latter being guided in aligned slots formed in a top plate 26 and a bottom plate 27. The latter plates comprise a keyboard frame which is suitably supported (in a manner not shown) by machine frame plates 28 and 29 comprising the main part of the machine framework.

Spring means (not shown) are provided for normally retaining the keys in their illustrated raised positions.

Means are provided for locking the amount keys in their depressed positions wherein their stems are effective to differentially limit the extent of movement of associated ones of the racks 18. For this purpose, each of the key stems is provided with a cam lobe 30 which, when the key is depressed, rocks a locking bail 31 outwardly (to the left in Fig. 4) about trunnion bearings 32, 32a and against the action of springs (not shown). As a depressed key reaches the bottom of its stroke, the cam lobe 30 thereof passes below the bail 31, enabling the latter to retract partially to a position where it latches the key. The lower end of the key stem 25 will now be located in the path of an associated shoulder 33 formed on the aligned rack 18.

A zero block lug 34 extends from the bail 31 and is normally located, when no key of the associated row is depressed, directly in front of one of the shoulders 33, preventing appreciable advance of the rack.

However, when an amount key in an associated row is depressed, the locking bail will carry the lug 34 out of blocking position relative to the rack.

Hand drive mechanism

Figure 1:
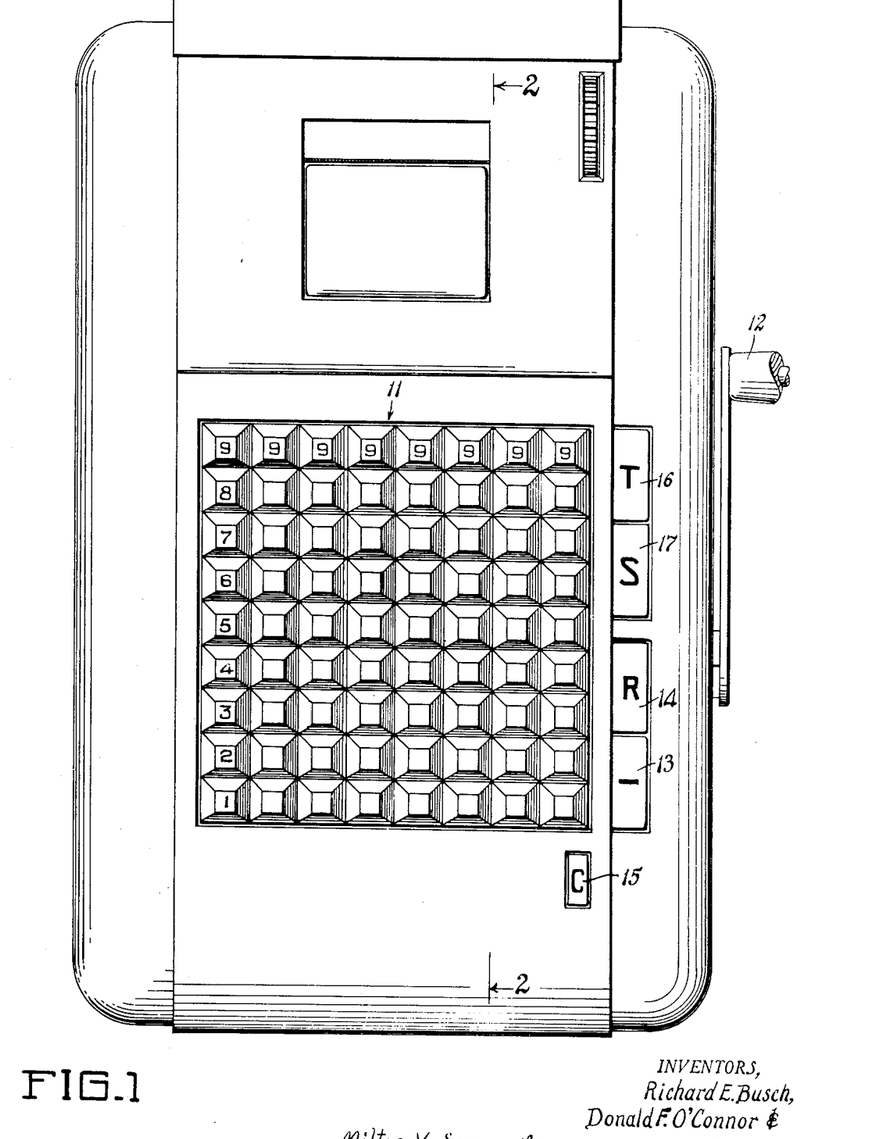
Fig. 1 is a plan view of an adding-listing machine embodying a preferred form of the present invention.
Figure 16:
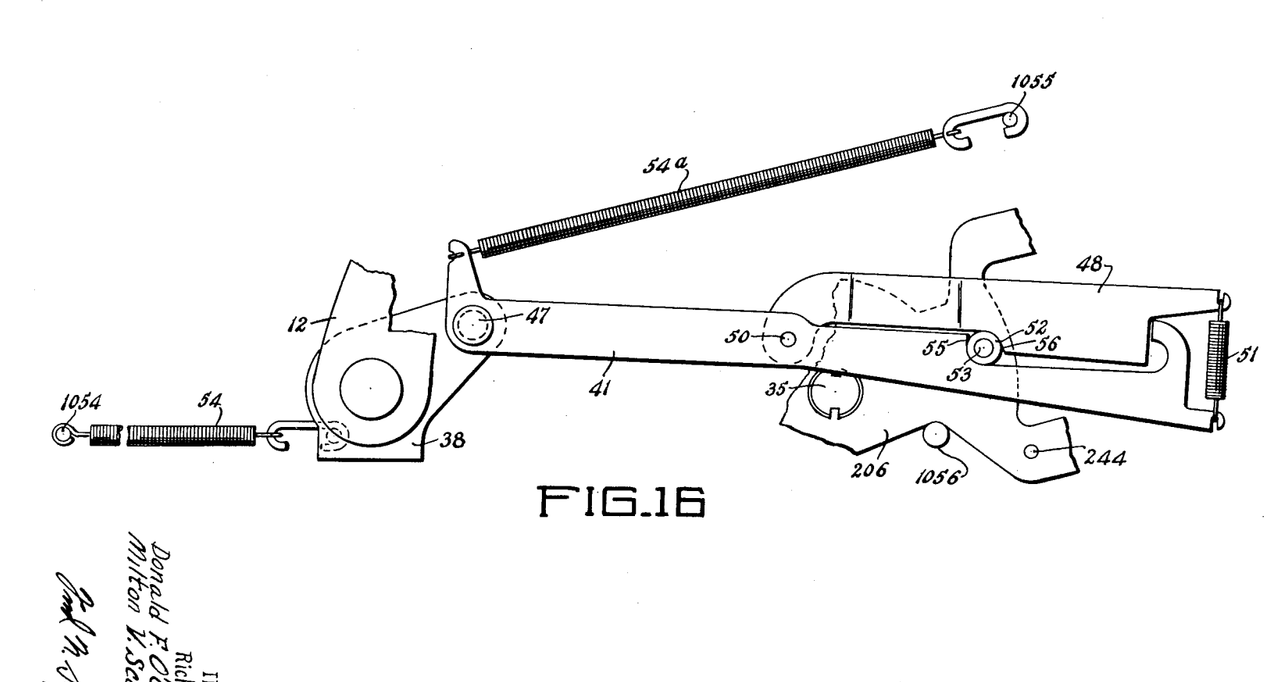
Fig. 16 is a side view illustrating the linkage between the drive handle and the main drive shaft.

The machine is driven by the operating handle 12 (Figs. 1 and 16) through a rockable drive shaft 35 supported for pivotal movement in bearings (not shown) carried by the machine frame plates 28 and 29. The handle is suitably secured to a bail 38 operatively connected to a drive link 41.

The drive link 41 which is pivotally connected at 47 to the bail 38, forms a yieldable connection to the drive shaft 35. For this purpose a driving pawl 48 is pivoted at 50 to the link 41 and a spring 51 is tensioned between the right-hand ends of these elements to hold the same in contact with a roller 52 rotatably mounted on a pin 53 which is secured to a drive sector 206. The latter is keyed on the drive shaft 35. A vertical shoulder 55 on the link 41 engages the roller 52 on one side thereof, whereas, an inclined shoulder 56 of the pawl 48 engages the roller on the opposite side thereof. Accordingly, the sector 206 will normally follow the link 41 and thus oscillate the shaft 35, but in the event that any part of the machine should become jammed during forward movement of the handle 12, the inclined edge 56 will move over the roller 52. This will cause the spring 51 to yield, and permit the link 41 to move relative to the roller 52 as the handle is moved forwardly. The shoulder 55 on the link 41 will be effective to invariably force the roller 52, and consequently the drive shaft 35 to return to their home positions illustrated in Fig. 16 should the hand crank be positively returned. However, the parts normally return to their home positions, and for this purpose two springs 54 and 54a are provided. The former is tensioned between a pin 49 on the bail 38 and a frame stud 1054. The spring 54a is tensioned between an extension of the link 41 and a frame pin 1055. Both springs are normally effective to hold the sector 206 in its home position where it rests against a frame pin 1056.

Figures 14, 15:
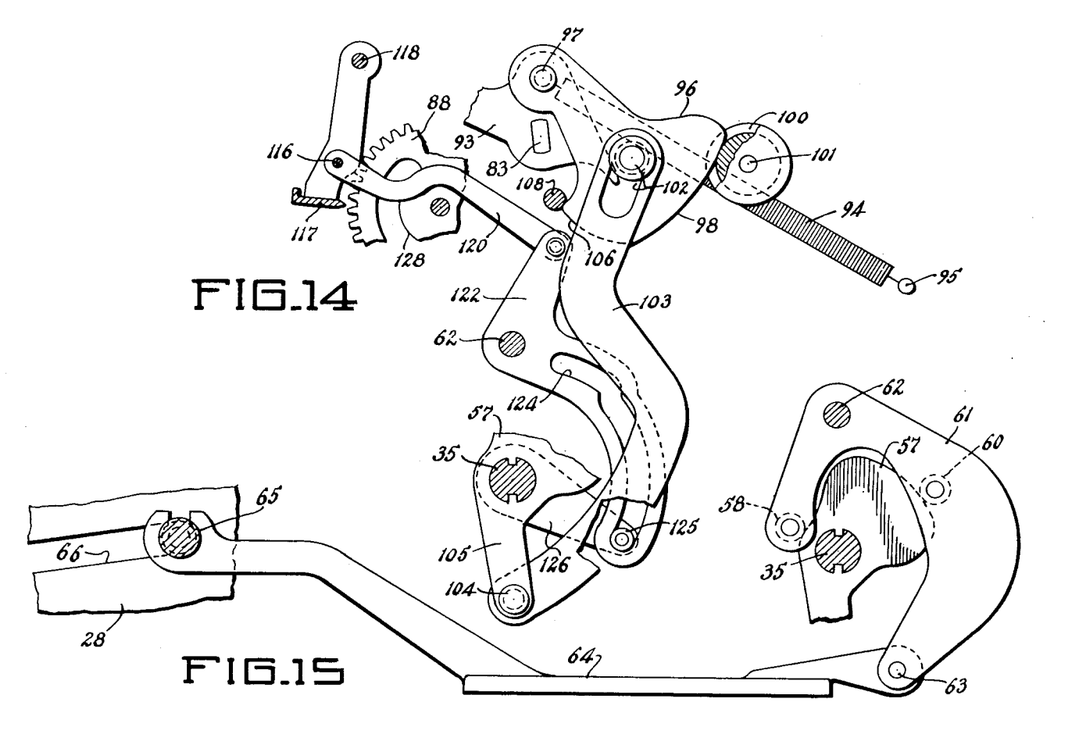
Fig. 14 is a side view of the printer control mechanism and the printer gear locking device.
Fig. 15 is a side view of the rack drive mechanism.

Means are provided for yieldably transmitting a drive from the drive shaft 35 to the various racks 18 located in the different denominational orders of the machine. For this purpose a cam 57 (Fig. 15) is keyed on the drive shaft 35 and is engaged by rollers 58 and 60 carried on a cam follower 61. The latter is pivoted on a stationary cross shaft 62 and is pivotally connected at 63 to a drive link 64. The latter is connected at its forward end to one end of a rack drive shaft 65. A cam and linkage identical to the cam 57, etc., is provided on the opposite side of the machine to cause fore and aft parallel reciprocation of the shaft 65 along guide slots 66 and 67 (see also Fig. 2) formed in the machine frame plates 28 and 29, respectively.

Each of the racks 18 has an elongated slot 68 therein embracing a circumferential groove in the shaft 65 to support the forward end of the rack. A second slot 70 in each rack embraces a circumferential groove in the cross shaft 62 for guiding the rack 18 during fore and aft movement thereof.

The slot 68 is provided with opposed notches 71 at its closed end. Each notch is normally engaged by a roller 72 carried on a drive pawl 73. The pawls are pivotally mounted on the shaft 65 and two such pawls associated with each rack are spring urged in opposite directions by a tension spring 74 connected between the forwardly extending tails of the pawls, whereby to form a yieldable connection between the drive shaft 65 and the respective rack 18.

When, during forward movement of the drive shaft 65, and consequently racks 18, a particular rack is arrested by engagement of a shoulder 33 thereof with an associated zero block lug 34 or a depressed key stem, the rollers 72 ride out of the notches 71, thus breaking the connection between the shaft and the rack.

The various shoulders 33 are spaced equal distances apart and such spacings are greater than the spacings between the various amount keys in the associated order of the machine by an amount equal to the pitch of the gear teeth formed on the racks. Thus, when a rack is advanced toward the front of the machine it will strike the lower end of a depressed key after it has advanced a number of increments or gear tooth spaces equal to the value of the depressed key.

In order to selectively add or subtract amounts from the keyboard into the accumulator 20, the racks are each provided with separate upper and lower rack sections 75 and 76, respectively, located on opposite sides of denominationally arranged accumulator gears 77, the latter being independently and rotatably mounted on an accumulator shaft 78.

As will be described in detail hereinafter, means are provided whereby during addition operations the accumulator will be raised to place the accumulator gears in mesh with the rack sections 75 during forward movement of the racks, and thereafter lowered into their neutral positions shown in Fig. 2 during return of the racks.

During subtraction operations, effected by presetting of the subtract key 13, the accumulator is lowered to mesh the accumulator gears with the lower rack section 76 so that during the ensuring advance of the racks, the gears will be rotated in the reverse direction and then returned to their neutral position during return of the racks. During totalling operations, the accumulator gears are likewise held in mesh with the lower rack sections 76 and are effective to arrest advance of the racks when the various accumulator gears return to their zero registering positions. The accumulator is then returned to its neutral position and retained therein during return of the racks. In subtotalling operations, however, the accumulator gears are held in mesh with the lower rack sections 76 during both the forward and return movements of the racks so as to re-enter the total in the accumulator after the same has been printed.

Printer

The printer mechanism 21 comprises a series of numeral type wheels 81, each entrained with a respective one of the racks 18. Each wheel has a series of type arranged around the periphery thereof and progressing in value from 0 to 9. These dials are so entrained with their racks that they will print a digit corresponding to the value of the key depressed in the associated order, or corresponding to the numeral position to which the rack is moved during its forward advance.

Each numeral wheel 81 is rotatably mounted on an individual arm 82, the latter being loosely keyed on a printed control shaft 83. A spring 84 is tensioned between each arm 82 and a stationary cross pin 85 to urge the arm and its wheel 81 toward the platen 23.

Figure 13:
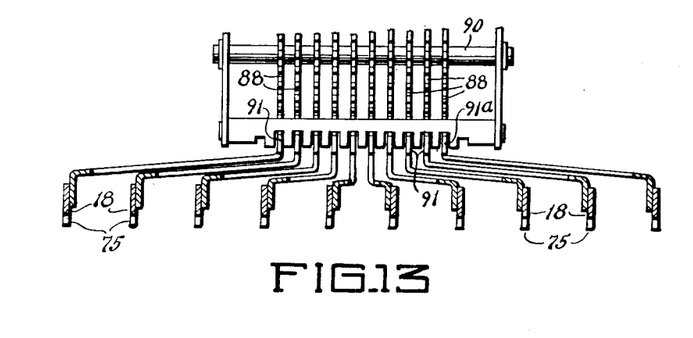
Fig. 13 is a sectional view through the racks, illustrating their offset extensions, and is taken along the lines 13—13 of Fig. 2.

Each printing wheel 81 has integral therewith a gear 86 permanently meshed with an idler 87, also rotatably carried on the respective arm 82. Except during printing operations, the arms 82 are held against the action of their springs 84 by the shaft 83 which is effective to locate the arms in their positions illustrated in Fig. 2. In the latter positions, the idlers 87 are maintained in mesh with gears 88 independently and rotatably mounted on a stationary cross shaft 90. The gears 88, in turn, directly mesh with rack gear sections 91 which are offset from, but form part of, the various racks 18. As indicated in Fig. 13, the various sections 91 overlap each other but permit independent movement of the racks.

Figure 11:
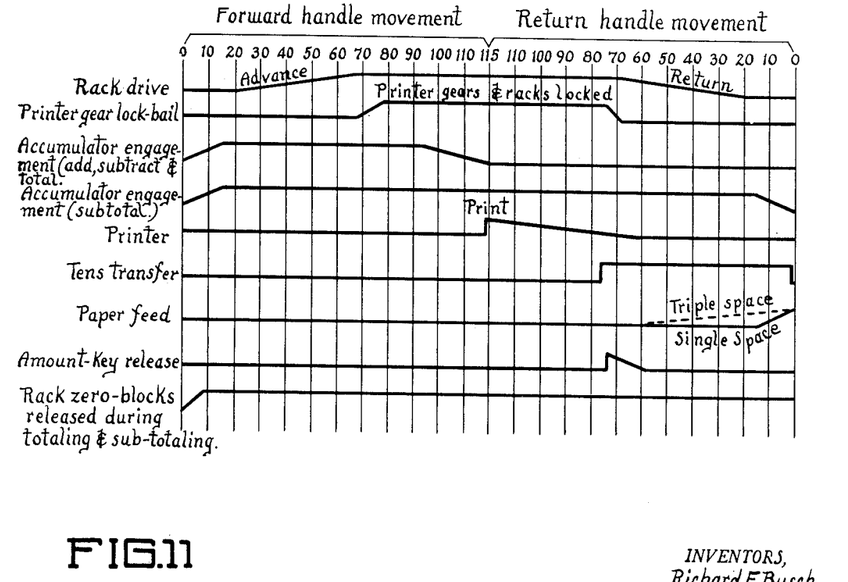
Fig. 11 is a timing chart illustrating the relative functions of the different components of the machine.

The printer control shaft 83 is rocked clockwise to initiate a printing operation just before the operating handle reaches the forward extremity of its stroke, as will be seen in Fig. 11. For this purpose, the shaft 83 is secured to an arm 93 (Fig. 14) which is urged clockwise by a tension spring 94 extending between the arm and a frame pin 95. A cam arm 96 is pivoted at 97 to the lever 93 and has an arcuate edge 98 formed thereon and extending concentrically about the pivot 97. The edge 98 is normally located in engagement with a grooved roller 100 rotatably mounted on a frame pin 101. In order to actuate the camming arm 96 the latter is coupled through pin and slot connection 102 to a link 103. The latter is pivoted at 104 to the depending extension 105 of the aforementioned cam lever 57 (see also Fig. 15).

As the drive shaft 35 is rocked counter-clockwise during advance of the handle, the link 103 will be raised, first taking up the lost motion in the pin and slot connection 102, and thereafter raising the cam arm 96 about its pivot 97. Since the surface 98 in effect forms a dwell, the arm 93 will be retained in position. However, toward the end of the forward movement of the handle, a camming portion 106 contiguous with the arcuate section 98 will move onto the roller 100, and since the section 106 is not concentric with pivot 97, the spring 94 will become effective to snap the arm 96 to the right, thereby rocking the arm 93 and shaft 83. The cam 96 will now rock sharply upward, being allowed to do so by the pin and slot connection 102. This action will permit all of the printer wheel carrying arms 82 (Fig. 2) which are otherwise allowed to do so, to be rocked clockwise by their springs, and thus bring the various type wheels 81 into contact with a printing ribbon 1057 and paper tape 22.

During return movement of the handle, the link 103 will be drawn downwardly, rocking the cam arm 96 about its pivot 97, and causing the cam portion 106 to cam along the roller 100. The resulting action will return the lever 93 and shaft 83 to their initial illustrated positions to return the various type wheels from printing contacts. The edge 98 will then pass along the roller 100, producing a dwell and the cam arm will come to rest against a frame pin 108.

Means are provided to prevent printing all zeros to the left of the highermost significant digit in a value being printed. For this purpose, a latch 110 is associated with each arm 82, the latches being independently and pivotally mounted on a stationary cross rod 111. The latches are urged clockwise by tension springs 112 and are provided with ears 113 adapted to overlie and latch tails 114 formed on the arms 82.

Normally, and during forward and return movements of the racks, the various latches 110 are held out of blocking relation with the arms 82, and for this purpose the latches are provided with triangular openings 115 through which a bail rod 116 extends. The latter is carried by a lock bail 117, the arms of which are pivoted on a stationary cross rod 118. The lock bail 117 forms an aligner arranged to move between two of the teeth of each of the printer gears 88 during the printing phase of a cycle. The bail 117 is actuated by the drive shaft 35, and for this purpose it is connected through a link 120 (Fig. 14) to a cam arm 122. The latter is pivoted on the shaft 62 and is provided with a crooked cam slot 124 therein, embracing a roller 125 carried on an arm 126. The latter is keyed on the shaft 35 and normally positions the roller 125 in the lower extremity of the slot 124 in the cam arm, thereby holding the locking bail 117 and the various latches 110 in their illustrated positions. However, after approximately 70° of forward movement of the hand crank, the roller 125 will ride over the hump in the slot 124, thereby causing the cam arm 122 to be actuated, drawing the locking bail 117 into its aligning position, and allowing the latches 110 to move inwardly under the action of their respective springs 112 until ears 127 thereon limit against the inner edges of slots 128 formed in the gears 88. Such inner edges are formed of a lower step 130 and a raised step 131, both concentric about the shaft 90.

When a rack is located in its zero or initial position (shown in Fig. 2) the lower step 130 will be located in registry with the ear 127, thereby permitting the associated latch 110 to move to latching position to prevent printing of a zero by its associated printing wheel 81. However, when any rack has moved to its "one" or other digital position, the raised step 131 of the associated gear 88 will be positioned under the ear 127 of the aligned latch, thereby preventing appreciable movement of said latch toward the tail 114 of the respective arm 82. The various latches have tails 132, each overlying the latch to the left so that when any latch is held in its outer illustrated position, it will hold all latches to the right thereof in such positions, thereby permitting printing of zeros in denominations located below, i. e., to the right of, the highermost significant digit.

*Accumulator*

The accumulator 20 is of the two-direction, subsequent transfer type and is disclosed in detail and claimed in the E. P. Drake Patent No. 2,472,696. Therefore only a brief description of the same will be made herein.

In general, the accumulator 20 comprises the aforementioned shaft 78 (Figs. 2, 3 and 12) and a second shaft 167 mounted in bearings formed in a series of denominationally spaced brace plates 168 which are rigidly held in spaced relation to each other by interlocking spacing combs 170, well known in the art. The shafts 78 and 167 are guided for vertical movement in vertically extending slots 171 and 172 formed in accumulator support plates on opposite sides of the machine, one of which is shown at 173, this arrangement permitting raising and lowering of the accumulator into its positions noted heretofore.

The tens transfer mechanism for the accumulator comprises a transfer pawl 174 in each denominational order of the machine. Each pawl is capable of rotating the associated accumulator gear 77 one increment or tooth space in the appropriate direction, depending on the type of operation being performed. Each pawl surrounds its associated gear 77 and is pivoted at 175 to a cam follower lever 176. The latter is pivotally mounted on the shaft 167 and carries a roller 177 engageable by an aligned one of the series of transfer cams 178. The cams 178 located in a different order of the machine are fastened in a helical arrangement about a transfer shaft 180. The latter is rotated one complete revolution during return of the racks to their home positions as will be described hereinafter.

The transfer pawl 174 is shown in its neutral position wherein it is ineffective to cause a transfer. In this condition the central one of three detents 181 is engaged by a centralizer 182. The latter is fulcrumed at 183 on the associated frame plate 168 and is urged clockwise by a spring 184 to engage the transfer pawl.

The accumulator gear 77 (Fig. 12) is shown in its zero registering position and, for example, upon clockwise movement thereof between its 0 and 9 registering positions, a transfer tooth 185 cammed thereby will engage an ear 186 on the transfer pawl 174, rocking the latter upwardly until the centralizer 182 engages the lower one of the three detents 181. In this condition, an actuating tooth 187 on the pawl is placed in alignment with one of the teeth of the accumulator gear. During the subsequent transfer phase wherein the transfer pawl will be advanced to the left, the tooth 187 will engage and advance the accumulator gear one tooth space.

Likewise, during addition, and when the accumulator gear is rotated counterclockwise, between its 9 and 0 registering positions, the transfer tooth 185 thereof will lower the transfer pawl to position a second actuating tooth 188 thereon in alignment with one of the teeth of the accumulator gear so that the gear will subsequently be advanced one tooth in an additive direction.

Accumulator positioning controls

Figure 2:
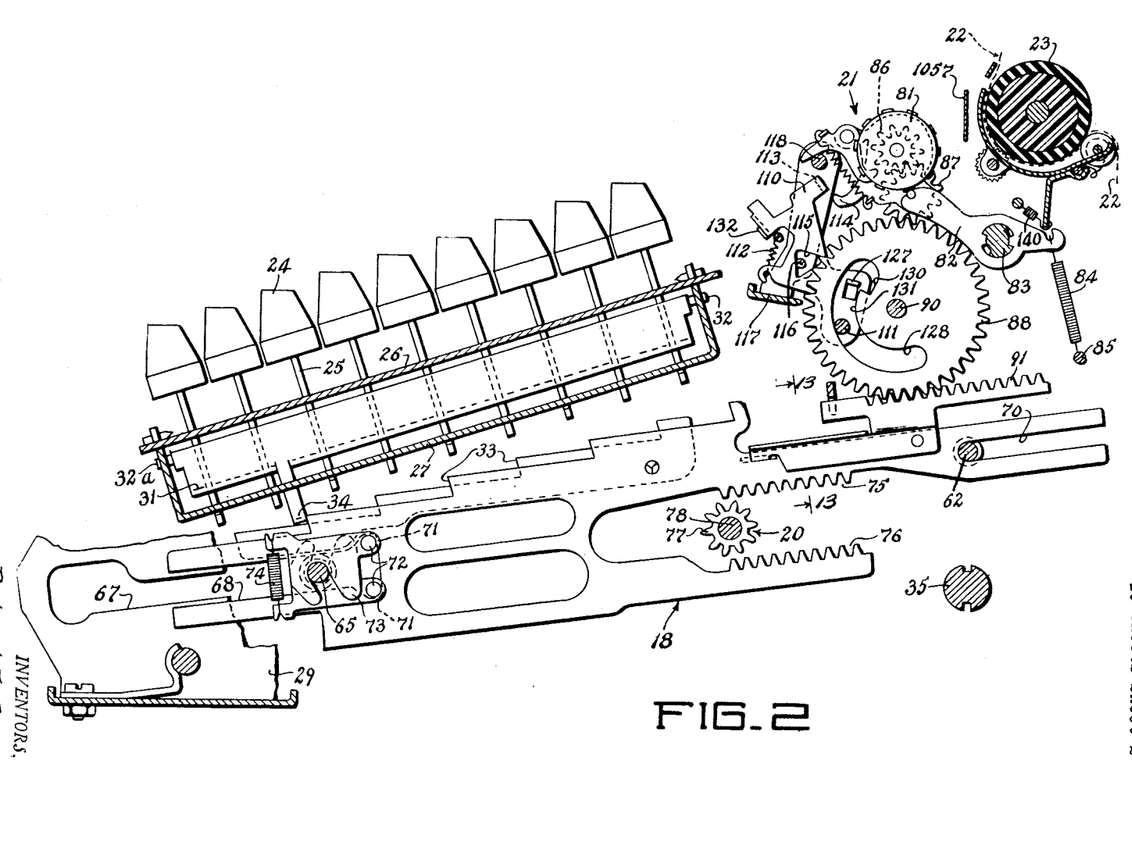
Fig. 2 is a longitudinal sectional view through the machine illustrating the keyboard racks, accumulator and printer mechanisms, and is taken along the line 2—2 of Fig. 1.
Figures 3, 4:
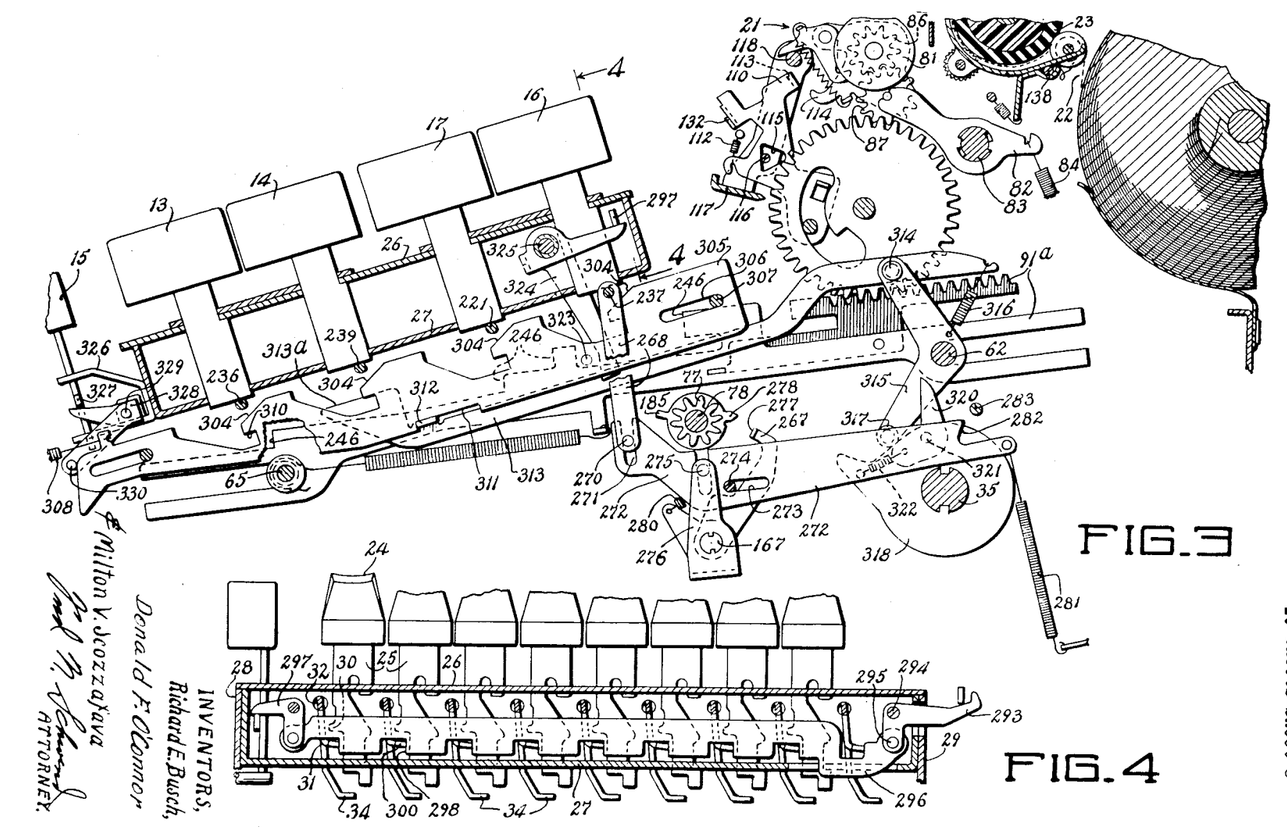
Fig. 3 is a longitudinal sectional view through the machine illustrating the control keys and mechanism associated therewith.
Fig. 4 is a sectional view of the keyboard and is taken substantially along the line 4—4 of Fig. 3.
Figure 12:
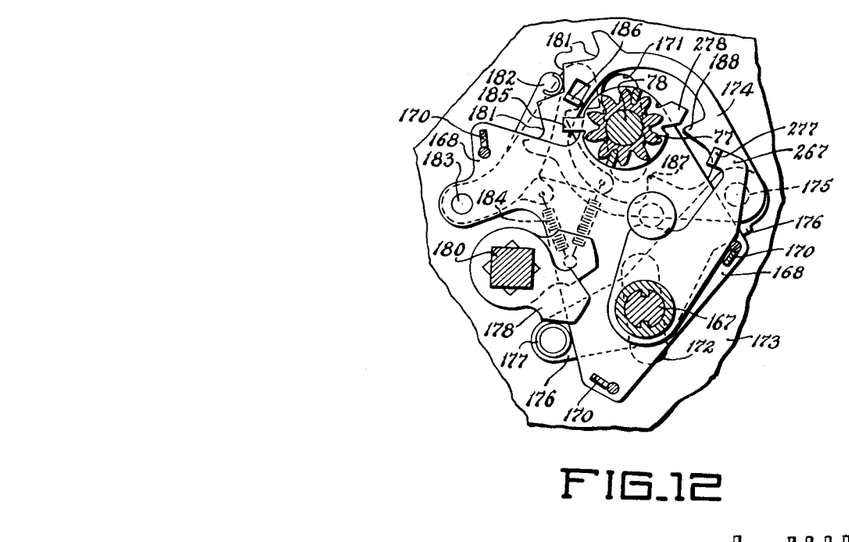
Fig. 12 is a transverse sectional view through the accumulator.

As noted heretofore, the accumulator is normally located in its neutral position shown in Figs. 2, 3 and 12, but is selectively raised or lowered along the guide slots 171 and 172 into mesh with the upper or lower rack sections 75 and 76 of the drive racks during adding and subtracting operations. Also, during adding, subtracting and totalling operations, the accumulator is demeshed from the racks at the completion of the forward advancement of the racks, while during subtotalling operations, the accumulator is held in mesh with the racks throughout the forward and return movements of the racks.

The present invention provides an improved accumulator positioning control mechanism for accomplishing the above functions which is simple and economical to manufacture and which is effective to positively move the accumulator from any of its three positions to another in lieu of the usual spring mechanism which is commonly used to return the accumulator from one position to a neutral or initial position. Thus, proper positioning of the accumulator is assured regardless of the speed of operation of the machine.

Each end of the accumulator shaft 78 carries a roller 190 embraced by a cam slot formed in a box cam, one of which is shown at 191 (Figs. 5 and 7–10). Each box cam is pivoted on a frame pin 192 and is normally held in a neutral position shown in Figs. 5 and 9 by a yieldable centralizer (not shown).

The two box cams on opposite sides of the machine are forced to rock in unison with each other by a rock shaft 193 mounted in suitable bearings (not shown) provided in the machine frame. An arm 194 fastened to the shaft 193 on each end thereof is provided with a roller 195 embraced by a radial slot 196 formed in the box cam.

Figure 7:
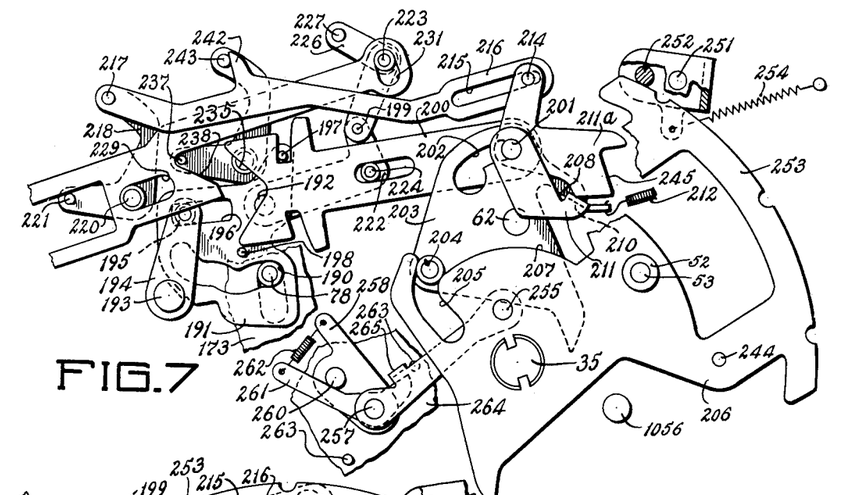
Fig. 7 is a view similar to that of Fig. 5 but with parts deleted, and showing the accumulator positioning mechanism in a position partway through an additive machine cycle.
Figures 8, 9:
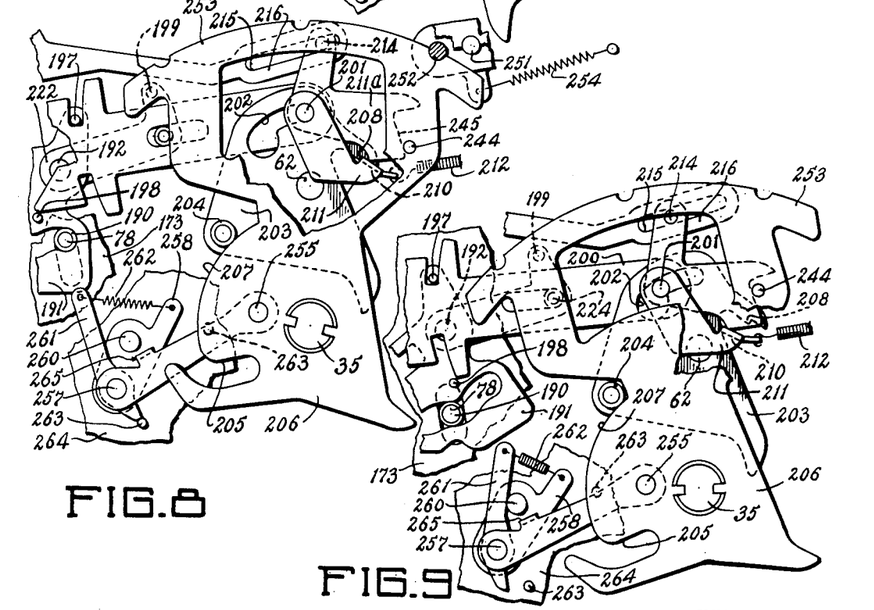
Fig. 8 is a view similar to Fig. 7 showing the parts in positions assumed near the end of the forward movement of the drive handle.
Fig. 9 is a view similar to Fig. 8, but showing the parts in positions assumed at the end of the forward movement of the drive handle.
Figure 10:
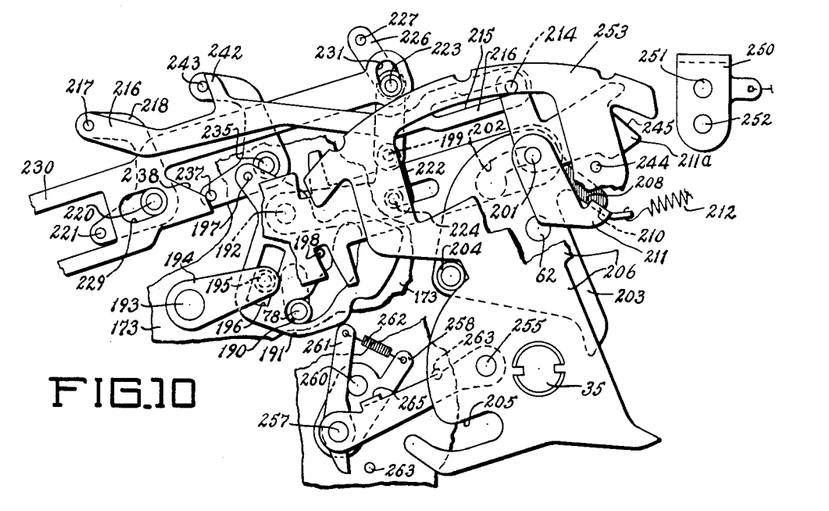
Fig. 10 is a view similar to that of Fig. 9, but illustrating the parts in positions adjusted by the subtotal key.

Figs. 7 and 8 illustrate the box cam 191 in a clockwise rocked position wherein it is effective to maintain the accumulator in a raised "add" position, whereas Fig. 10 illustrates the box cam in a counterclockwise rocked position wherein it is effective to maintain the accumulator in its lower "subtract" position.

In order to effect rocking of the box cam 191, pins 197 and 198 are attached thereto on opposite sides of the frame pin 192. The pins 197 and 198 are adapted to be selectively engaged by a hook member 200 depending upon which of the particular control keys is depressed. The hook member is provided with a pin 201 which is slidably mounted in an arcuate slot 202 formed in an actuating lever 203. The lever 203 is pivotally mounted on the stationary shaft 62 and the slot 202 extends concentrically about this shaft. The lever 203 is provided with a roller 204 engageable in a cam slot 205 formed in a sector 206 which is keyed on the drive shaft 35. During each cycle of the machine the sector 206, which oscillates through approximately 90°, causes, through its cam slot 205, rocking of the actuating lever 203 clockwise from its initial position shown in Fig. 5 to that shown in Fig. 7 during approximately the first 20° of counterclockwise movement of the sector. Thereafter, the roller 204 rides on a guide surface 207 which is concentric about the drive shaft 35, thereby forming a dwell.

The lever 203 is provided with a notched shoulder 208 which normally engages an ear 210 formed on an interponent or latch 211, the latter being pivoted on the pin 201. A spring 212 tensioned between a frame pin 213 and the interponent 211 normally holds the hook member 200 and pin 201 at the rear end of the slot 202.

A combined release and retracting lever 211a is also pivoted on the pin 201 independently of the interponent 211 and is urged clockwise by a light spring 212a extending between a pin 214 carried on the lever 211a and the interponent 211 whereby to hold a foot portion of the lever normally in engagement with the ear 210 of the interponent. The pin 214 rides in an elongated slot 215 formed in a slide link 216. The latter is pivoted at 217 to the upper end of a bell crank 218 which is pivotally mounted on a frame pin 220. The bell crank has a pin 221 thereon (see also Fig. 3) which underlies the stem of the subtotal key 17, the purpose of which will be described hereinafter.

Means are provided for normally holding the hook member 200 in a raised position (shown in Figs. 5, 7, 8 and 9) in coupling engagement with the pin 197 and for lowering the same into its position shown in Fig. 10 in coupling engagement with the pin 198. For this purpose, a bell crank 222 is pivoted on the frame pin 192 and is provided with a pin and slot connection 224 with the hook member. A toggle arrangement is provided for raising and lowering the bell crank comprising links 225 and 226, the former being connected to the bell crank 222 at 199 and the latter pivotally supported on the frame pin 227. A pin 223 pivotally connects the links together and a tension spring 228 connected between the frame pin 227 and the pin 224 of the bell crank 222 normally collapses the toggle arrangement to hold the hook member 200 in its elevated "add" controlling position.

A cam bar 230 has a vertical slot 231 embracing the pin 223. The cam bar is provided with horizontal guide slots 229, one of which embraces the aforementioned frame pin 220 and the other embraces a second frame pin 232, permitting forward movement of the cam bar 230 to straighten the toggle arrangement and thus lower the hook member.

Means are provided whereby depression of any of the control bars 13, 16 and 17 is effective to actuate the cam bar and thus lower the hook member 200. For this purpose, bell cranks 233 and 234 pivoted on frame pins 232 and 235, respectively, are provided with pins 236 and 237, respectively, underlying the stems of the subtract and total keys 13 and 16. The latter pins also overlie inclined camming surfaces 238 formed on the bar 230, whereby depression of either of the keys will cam the bar 230 forwardly.

Similarly, a pin 239 (described hereinafter) carried by an arm 240 pivoted on a frame pin 241 underlies the stem of the repeat bar 14, but does not effect a movement of the cam bar 230.

Figure 5:
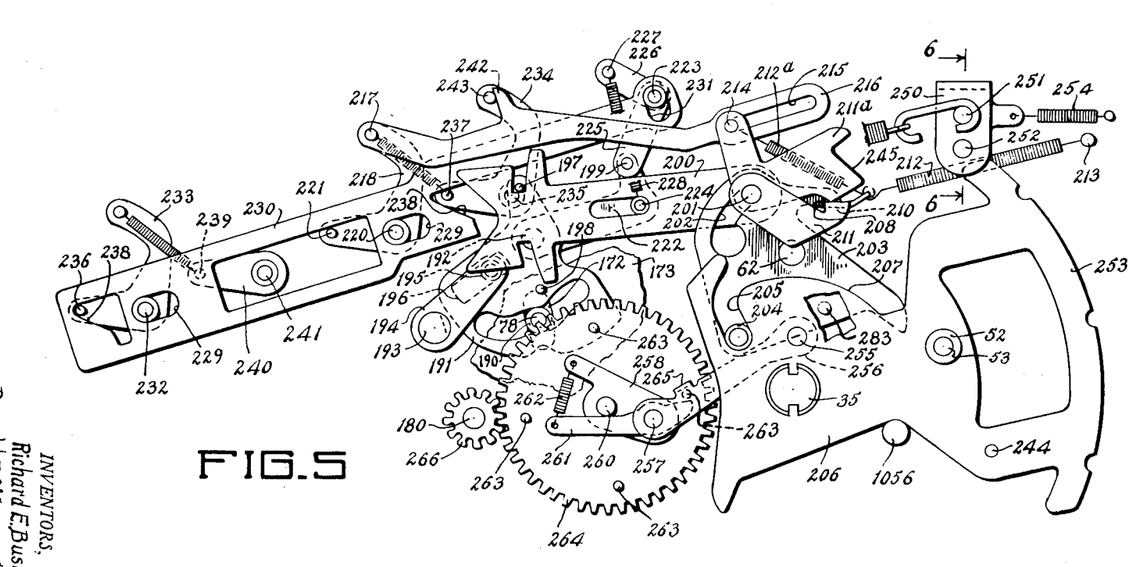
Fig. 5 is a side view of the accumulator positioning mechanism and the drive for the accumulator tens transfer mechanism.

It will be noted in Fig. 5 that the slide link 216, which is moved to the left upon depression of the subtotal key 17, is provided with a shoulder 242 lying directly behind a pin 243 on the total actuated bell crank 234 so that depression of the subtotal bar will rock the bell crank 234 to likewise cause forward movement of the cam bar 230 to lower the hook member 200.

Assuming an add operation to be performed, the amount to be added is entered into the keyboard and the handle is operated without depressing any of the various control bars. As the drive sector 206 is rocked counterclockwise from its position shown in Fig. 5, it will first become effective, through approximately the first 20° of counterclockwise movement, to rock the actuating lever 203 clockwise. Since the shoulder 208 of the lever 203 is now in engagement with the ear 210 of the interponent 211, the hook 200 will be drawn rearwardly, thereby rocking the box cam 191 to raise the accumulator to its add condition. Thereafter, and through approximately 50° of movement of the hand crank, the racks will be advanced to drive their respective accumulator gears in the appropriate direction. As the sector 206 reaches its position illustrated in Fig. 8 (after the racks have completed their advancement) a pin 244 on the sector strikes an inclined camming edge 245 on the release lever 211a, first camming the latter clockwise and thus forcing the interponent 211 out of engagement with the shoulder 208 of the actuating lever 203. It should be noted that the slot 215 in the link 216 is of sufficient length to permit such movement of the release lever at this time. Continued forward movement of the sector 206 toward its extreme counterclockwise rocked position, as shown in Fig. 9, will cause the pin 244 to force the release lever 211a, and along with it the pin 201 and the hook member 200, forwardly along the arcuate slot 202, thereby returning the box cam 191, and consequently the accumulator, to their neutral positions.

As the sector 206 recedes from its forwardly advanced position (Fig. 9) to its normal position (Fig. 5) during return of a hand crank, the hook member 200 and associated parts remain in their adjusted positions shown in Fig. 5.

When the handle approaches its initial home position, the roller 204 will re-enter the cam slot 205, rocking the actuating lever back to its initial position shown in Fig. 5 and causing the interponent 211 to be relatched by the shoulder 208.

In subtract operations initiated by predepression of the subtract bar 13, precisely the same movement of the aforementioned mechanism will occur except that the accumulator will be lowered to its subtract condition during the first part of the machine cycle and then returned.

Totalling operations effected by predepression of the total key 16 will be effected in substantially the same manner as subtract operations. However, during subtotalling operations effected by depression of the subtotal bar 17, the accumulator must be held in its lowered subtractive position throughout the major portion of the cycle. For this purpose, depression of the subtotal bar will rock its associated bell crank 218 into its position shown in Fig. 10, drawing the slide link 216 forwardly so that the rear end of the slot 215 therein will be brought adjacent the pin 214 on the release lever 211a. Now, as the parts are actuated and the lever 203 is rocked clockwise by the sector 206, the pin 201 in moving rearwardly will rock the release lever 211a counterclockwise about the pin 214 as a fulcrum, thereby raising the release lever above the path of the aforementioned pin 244 on the drive sector 206. Consequently, as the drive sector moves toward the forward limit of its travel, as shown in Fig. 10, the pin 244 will pass below the release lever 211a and will be ineffective to release the interponent 211 from the shoulder 208. Consequently, the hook member 200 will be positively retained in its rearward position throughout the return of the handle and drive sector until the roller 204 re-enters the cam slot 205 toward the end of the cycle. Thereupon, as the actuating lever 203 is rocked counterclockwise, it will, through the rear end of the slot 202, pick up and return the hook member 200 forwardly to return the accumulator to its neutral position. The latter operation occurs after the racks have returned to their initial positions, as will be apparent on reference to a timing diagram of Fig. 11.

Figure 6:
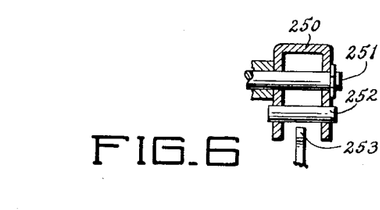
Fig. 6 is a sectional view of the full-stroke pawl device and is taken along the line 6—6 of Fig. 5.

In order to enforce a full stroke of the drive handle 12 through its total range of movement, a full stroke pawl 250 is provided. The pawl is in the shape of a yoke as shown in Fig. 6, and is fulcrumed on a frame pin 251. A cross pin 252 fixed between the spaced legs of the pawl is arranged to ride on the notched periphery 253 formed on the rear edge of the drive sector 206. A spring 254 tensioned between the pawl 250 and a suitable part of the machine frame normally holds the pawl in a position substantially midway between the positions to which it may be rocked by the sector during reverse rocking movements thereof, the pawl returning to its neutral position at each extremity of movement of the sector.

The drive sector is also effective during the return movement in each oscillation thereof to cause a complete rotation of the aforementioned tens transfer shaft 180 (Figs. 5 and 12) in a clockwise direction. For this purpose, the sector is pivotally connected at 255 to a link 256, the latter having a pivotal connection 257 to an arm 258 which is freely pivoted on a frame pin 260.

Also pivoted at 257 is a by-pass type drive pawl 261. The spring 262 tensioned between the arm 258 and pawl 261 normally holds the latter in engagement with the frame pin 260. During forward or counterclockwise movement of the drive sector, the arm 258 will be rocked clockwise, causing the pawl 261 to cam over one of four equally spaced pins 263 carried on a drive gear 264 which is also pivotally mounted on the frame pin 260 independently of the arm 258. At the forward extremity of movement of the arm 258 the pawl 261 will snap behind said pin 263, as shown in Fig. 9, and consequently during return movement of the sector, the pawl will pick up the pin, rotating the gear 264 through 90° in a counterclockwise direction. An ear 265 formed on the link moves into a position overlying the actuated pin 263 as the parts resume their initial position at the end of the cycle, whereby to prevent overthrow of the gear 264. The latter gear 264 meshes with a pinion 266 suitably secured to one end of the tens transfer shaft 180, the pitch diameter of the gears 264 and 266 being related in a ratio of 4 to 1, whereby to cause a complete rotation of a transfer shaft during this cycle of operation of the machine.

*Totalling and subtotalling controls*

The total and subtotal keys 16 and 17, respectively, in addition to controlling the setting of the accumulator as heretofore described, cause release of any amount key inadvertently depressed as an incident to totalling operation and effect outward rocking of the lock bails 31 (Figs. 2 and 4) to permit advance of the racks. These keys also effect setting of accumulator gear zero stop arms 267 (Figs. 3 and 12) in position to arrest the accumulator gears 77 in their zero registering positions. As shown in Fig. 3, the total key operated pin 237 has suspended thereon a link 268 carrying a pin 270 which slides along a vertical slot 271 carried in a rocking slide link 272. The latter has an elongated slot 273 which is guided over a frame pin 274, permitting both rocking and sliding movement of the link. The link 272 has a pin and slot connection 275 with a bail 276 fastened to the aforementioned lower shaft 167 forming part of the accumulator unit. The various zero stop levers 267 are also keyed on the latter shaft, and upon counterclockwise movement of the shaft from its normal position shown in Figs. 3 and 12, an ear 277 on each thereof will move to a blocking position in the path of a stop lug 278 extending from the associated accumulator gear 77. A spring 280 tensioned between one arm of the bail 276 and the pin 274 normally holds the shaft 167 in its position shown in Figs. 3 and 12, wherein the zero stop arms 267 are held out of cooperative relation with their respective accumulator gears. However, upon depression of the total key 16, the pin 270 will, upon downward movement of link 268, force the slide link 272 to rock about the pin 274 against the action of a light spring 281 to position a shoulder 282 directly in front of a pin 283. The latter pin (see also Fig. 5) is secured to the aforementioned actuating lever 203. Accordingly, at the very start of a totalling operation, the lever 203 will force the pin 283 to move the slide 272 forwardly, rocking the shaft 167 and positioning the zero stop levers in their blocking positions.

It will be noted on reference to Figs. 5, 7 and 10 that since the shoulder 242 of the slide 216 lies directly behind the pin 243 of the total key operated bell crank 234, that depression of the subtotal key 17 and consequent rocking of the bell crank 218 will cause the bell crank 234 to rock in unison therewith, and thus likewise effect positioning of the zero stop levers 267.

Suitable means (not shown) are provided to hold the amount key locking bails 31 and their zero blocking lugs 34 outwardly to permit free advance of the various racks 18 during totaling and subtotaling operations.

Keyboard releasing control

All of the keys, including the various control keys, excepting the clear key 15 (Figs. 1 and 3), are of the latchdown type which are automatically retained in depressed condition. Also, all of the latter keys are automatically released during an ensuing cycle except the repeat key 14 which remains latched until released by depression of the clear key or another one of the control keys. However, if the repeat key 14 and subtract key 13 are simultaneously depressed, both will remain in such condition until released by the clear key 15, or one of the remaining total and subtotal keys 16 and 17.

The pins 236, 239, 221 and 237 underlying the stems of control keys 13, 14, 17 and 16, respectively, overlie similar camming surfaces 304 formed on a lock bar 305. The latter is provided with guide slots 306 embracing frame pins 307 and is normally held in its forward illustrated position by a tension spring 308. Thus, depression of any of the control keys will force its respective pin to cam the latch bar 305 to the right in Fig. 3. On further downward movement of one of the control keys, a respective pin will pass below a locking shoulder 310 on the lock bar, permitting the same to retract partly and thus latch the control key actuated linkage in controlling position. The lock bar is provided with an elongated notch 311 which lies in engagement with an ear 312 formed on a key release link 313. The latter is pivoted at 314 on a bell crank 315 fulcrumed on the aforementioned cross shaft 62. A spring 316 is tensioned between the bell crank 315 and a tail on the link 313, thereby normally holding the ear 312 in engagement with the notch 311.

A roller 317 on the lower end of bell crank 315 is urged by spring 316 against the periphery of a cam disc 318 keyed on the drive shaft 35. A pawl 320 is pivoted at 321 on the disc 318 and is normally held in its position shown in Fig. 3 by tension spring 322 extending between the pawl and a pin on the disc 318. As the drive shaft is rocked counterclockwise from its initial position, the pawl 320 will merely pivot about its pin 321 as it passes below the roller 317, the spring 322 yielding during this movement. However, upon return of the shaft 35 and toward the end of the cycle, the pawl 320 will be rocked counterclockwise relative to disc 318 as it moves under the roller 317 until a portion thereof strikes the shaft 35, at which time it will force the cam follower 315 clockwise, causing the link 313 to move rearwardly. After a short travel, the ear 312 will pick up the rear edge of the notch 311 in lock bar 305 and thereafter move the latter to the rear to release whichever of the control key operated pins had peviously been latched. Further movement of the latch bar 305 a short distance will cause a pin 323 thereon to pick up a bell crank 324 fulcrumed at 325, rocking the latter counterclockwise. A rearwardly extending arm of the bell crank 324 underlies one arm of the bell crank 297 (see also Fig. 4) and is therefore effective to actuate the release bar 296 so as to release all depressed amount keys.

The link 313 is provided with a raised shelf 313a underlying the pin 239 operable by the repeat key. Thus, when the repeat key 14 is depressed to a point where the pin 239 is latched by the lock bar 305, the latter pin will depress the link 313 sufficiently to move the ear 312 of the link 313 out of the notch 311. Consequently, during an ensuing machine cycle, the link 313 will move idly without picking up the lock bar 305. Consequently, amount entered into the keyboard will be retained and repetitively entered into the accumulator until the repeat bar and amount keys are subsequently released by depression of the clear key 15 or the depression of the total and subtotal keys. Likewise, if both the subtract and repeat keys 13 and 14 are simultaneously depressed, the link 313 will be rendered ineffective to actuate the lock bar 305 and both the keys 13 and 14 will be retained in their depressed positions.

In order to enable the clear key 15 to cause release of depressed keys, the latter is slidably mounted in aligned slots formed in a guide bracket 326 suitably attached to the walls of the keyboard frame. A shoulder 327 formed on the stem of the key 15 overlies one arm of a lever 328 pivoted at 329 and provided with a pin 330 which engages the forward edge of the lock bar 305. Thus, depression of the clear key will cause the lock bar to first release any depressed control key and thereafter cause the pin 323 thereof to actuate the bell crank 224 to release all depressed amount keys.

It will be noted that the clear key 15 may be actuated to effect release of one or more depressed control keys without releasing depressed amount keys by limiting downward movement thereof. Likewise, it should be noted that depression of one of the control keys, although effective to cause sufficient rearward movement of the rack bar 305 to release any other depressed key, will be ineffective to cause sufficient movement of the rack bar 305 to release depressed ones of the amount keys. This is because of the slight clearance between the pin 323 and the bell crank 324.

A conventional symbol rack 91a is shown in Fig. 3 having shoulders 246 provided for engagement with the pins underlying the control bars. The symbol rack is suitably entrained with a symbol printer wheel in a manner similar to the remaining racks, the latter wheel having appropriate symbol type thereon.

Modified form

Figures 17, 18, 19:
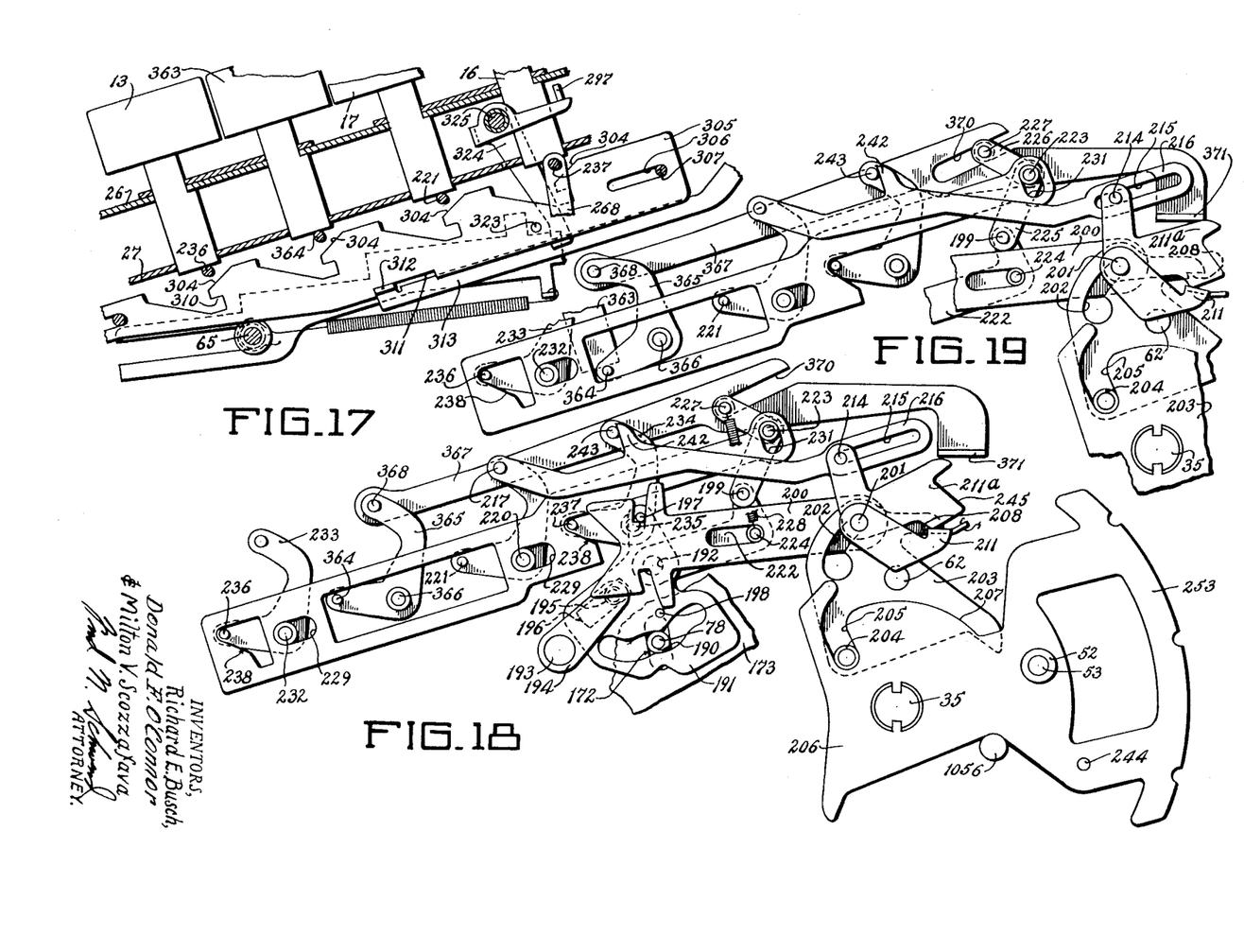
Fig. 17 is a side view of a modified form of control key arrangement.
Fig. 18 is a side view of the accumulator controls associated with the modified control key arrangement.
Fig. 19 is a view similar to Fig. 18 but showing the condition of the parts resulting from depression of the nonadd bar.

Figs. 17–19 illustrate a modified form of the invention wherein a nonadd key 363 is substituted for the aforementioned repeat key 14. In these figures the parts in common with the parts illustrated in the remaining figures will have the same reference numerals applied.

Located similarly to the bar 14 and its underlying pin 239 is a nonadd key 363 having its stem overlying a pin 364 carried by a bellcrank 365 which is pivoted on a frame pin 366. A camming link 367 is pivoted at 368 to an upstanding arm of the bellcrank and has a guide slot 370 therein slidably embracing the aforementioned frame pin 227. An ear 371 formed on the rear end of the link 367 normally lies above and to the rear of the release lever 211a and thus has no effect on this lever when the nonadd key is left in its raised position. However, upon depression of the nonadd key and consequent counterclockwise rocking of bellcrank 365 as shown in Fig. 19, the link 367 will be drawn forwardly, causing its ear 371 to engage the release lever 211a. The latter will thereby be rocked clockwise sufficiently to lower the interponent 211 to a position below the shoulder 208 of the actuating lever 203. Accordingly, during subsequent operation of the machine, the actuating lever 203 will be ineffective to move the hook member 200. Therefore, the accumulator will be left in its neutral position throughout the ensuing machine cycle.

The shelf 313a is removed from the link 313. Therefore, the pin 364 does not move the ear 312 from the notch 311 as is true with the pin 239.

For the sake of brevity, various operating mechanisms of the machine disclosed herein have been omitted since they do not embody the present invention. However, reference may be had to the following copending applications which disclose and claim certain of such additional mechanisms; R. E. Busch et al., Serial No. 442,552, filed July 12, 1954; Lloyd L. Fielder, Jr., et al., Serial No. 433,684, filed June 1, 1954; Richard E. Busch et al., Serial No. 442,522, filed July 12, 1954; Eugene E. Bennett, Serial No. 433,695, filed June 1, 1954; and Bryan F. Kuhne, Serial No. 433,323, filed June 1, 1954.

Although we have described our invention in detail and have therefore used certain terms and languages herein, it is to be understood that the present invention is illustrative rather than restrictive, and that changes and modifications may be made without departing from the spirit or

Having thus described the invention, what we desire to secure by United States Letters Patent is:

1. In a calculating machine, the combination with differential actuators and accumulator elements normally out of cooperative relation with said actuators, of means including a control member movable from a first position to a second for moving said accumulator elements into cooperative relation with said actuators; an oscillating drive member, means including an interponent normally operatively associated with said drive member and said control member for moving said control member from said first to said second position during movement of said drive member in one direction, said last mentioned means being effective to maintain said control member in said second position during actuation of said accumulator elements by said actuators, and means operable thereafter by said drive member during movement thereof in said one direction for moving said interponent out of said cooperative association and for returning said control member to said first position.

2. In a calculating machine, the combination with differential actuators and accumulator elements normally out of cooperative relation with said actuators, of means including a control member movable from a first position to a second for moving said accumulator elements into cooperative relation with said actuators; an oscillating drive member, an actuating element operable by said drive member in a direction opposite to the direction of movement of said drive member, means including an interponent normally interposed between said actuating element and said control member for moving said control member from said first to said second position during movement of said drive member in one direction, and means operable thereafter by said drive member during movement thereof in said one direction for removing said interponent from said interposition and for returning said control member to said first position.

3. In a calculating machine, the combination with differential actuators and accumulator elements normally out of cooperative relation with said actuators, of means including a control member movable from a first position to a second for moving said accumulator elements into cooperative relation with said actuators; an oscillating drive member having a cam surface thereon, a cam follower engageable with said cam surface, a coupling member carried by said control member, means normally connecting said coupling member to said cam follower for moving said control member from said first to said second position during movement of said drive member in one direction, and means operable thereafter by said drive member during movement in said one direction for disconnecting said coupling member from said cam follower and for returning said control member to said first position.

4. In a calculating machine, the combination with differential actuators and accumulator elements normally out of cooperative relation with said actuators, of means comprising a control member movable from a first position to a second for moving said accumulator elements into cooperative relation with said actuators; an oscillating drive member, an actuating element operable by said drive member in a direction opposite to the direction of movement of said drive member, means including an interponent normally interposed between said actuating element and said control member for moving said control member from said first to said second position during movement of said drive member in one direction, a device operatively connected to said control member, said device being adapted to move said interponent out of said cooperative relation and to move said control member to said first position, means operable by said drive member during movement thereof in said one direction and after movement of said control member to said second position for actuating said device, and selectively settable means for rendering said device ineffective.

5. In a calculating machine, the combination with differential actuators and accumulator elements normally out of cooperative relation with said actuators, of means comprising a control member movable from a first position to a second for moving said accumulator elements into cooperative relation with said actuators; an oscillating drive member, an actuating element operable by said drive member in a direction opposite to the direction of movement of said drive member, means including an interponent normally interposed between said actuating element and said control member for moving said control member from said first to said second position during movement of said drive member in one direction, a device operatively connected to said control member, said device being adapted to move said interponent out of said cooperative relation and to move said control member to said first position, means operable by said drive member during movement thereof in said one direction and after movement of said control member to said second position for operating said device, selectively settable means for rendering said device ineffective after movement of said control member to said second position, and means operable by said drive member during movement thereof in the opposite direction for independently returning said control member to said first position.

6. In a calculating machine, the combination with differential actuators and accumulator elements normally out of cooperative relation with said actuators, of means including a control member movable from a first position to a second for moving said accumulator elements into cooperative relation with said actuators; an oscillating drive member, an actuating element operable by said drive member in a direction opposite to the direction of movement of said drive member, a lost motion connection between said control member and said actuating element, means normally maintaining said control member at one extreme of said lost motion connection whereby to move said control member from said first to said second position during movement of said drive member in one direction, and a device operable thereafter by said drive member during movement thereof in said one direction for disabling said last-mentioned means and for returning said control member to said first position.

7. In a calculating machine, the combination with differential actuators and accumulator elements normally out of cooperative relation with said actuators, of means including a control member movable from a first position to a second for moving said accumulator elements into cooperative relation with said actuators; an oscillating drive member, an actuating element operable by said drive member in a direction opposite to the direction of movement of said drive member, a lost motion connection between said control member and said actuating element, means normally maintaining said control member at one extreme of said lost motion connection, whereby to move said control member from said first to said second position during movement of said drive member in one direction, a device operable thereafter by said drive member during movement thereof in said one direction for disabling said last-mentioned means and for returning said control member to said first position, and selectively settable means for disabling said device, said lost motion connection being capable upon movement of said drive means in the opposite direction to return said control member to said first position.

8. In a calculating machine, the combination with differential actuators and accumulator elements normally out of cooperative relation with said actuators, of means comprising a control member movable from a first position to a second for moving said accumulator elements into cooperative relation with said actuators; an oscillating drive member, means including an interponent normally operatively associated with said drive member and said control member for moving said control member from said first to said second position during movement of said drive member in one direction, said last mentioned means being effective to maintain said control member in said second position during actuation of said accumulator elements by said actuators, means operable thereafter by said drive member during movement thereof in said one direction for moving said interponent out of said cooperative association and for returning said control member to said first position, and selectively settable means operable independently of said last-mentioned means for moving said interponent out of said cooperative association.

9. In a calculating machine, the combination with differential actuators and accumulator elements normally out of cooperative relation with said actuators, of means including a control member movable from a first position to a second for moving said accumulator elements into cooperative relation with said actuators; an oscillating drive member having a cam surface thereon, a cam follower engageable with said surface, said cam follower having an elongated slot therein, a pin carried by said control member and movable along said slot, a latch pivotally supported by said pin, means normally maintaining said latch in engagement with said cam follower whereby to move said control member from said first to said second position during movement of said drive member in one direction, a release member pivotally supported by said pin and having a camming surface thereon, and means operable thereafter by said drive member during movement in said one direction for engaging said camming surface to cause said release member to disengage said latch and to return said control member to said first position.

10. In a calculating machine, the combination with differential actuators and accumulator elements normally out of cooperative relation with said actuators, of means including a control member movable from a first position to a second for moving said accumulator elements into cooperative relation with said actuators; a rockable drive member, a rockable actuating element, said actuating element being rockable by said drive member in a direction opposite to the direction of movement of said drive member, said actuating element having an elongated slot therein, a bearing carried by said control member and movable along said slot, a latch pivotally supported by said bearing, means normally maintaining said latch in engagement with said actuating element whereby to move said control member from said first to said second position during movement of said drive member in one direction, a release member pivotally supported by said bearing and having a camming surface thereon, means operable by said drive member during movement in said one direction and after movement of said control member to said second position for engaging said camming surface to cause said release member to disengage said latch and to return said control member to said first position, and selectively settable means for causing said release member to move out of the path of said last-mentioned means upon movement of said control member to said second position, said actuating element being adapted to directly move said control member to said first position during movement of said drive member in the opposite direction.

11. In a calculating machine, the combination with differential actuators and accumulator elements normally out of cooperative relation with said actuators, of means including a control member movable from a first position to a second for moving said accumulator elements into cooperative relation to said actuators; a rockable drive member, a rockable actuating element, said actuating element being rockable by said drive member in a direction opposite to the direction of movement of said drive member, said actuating element having an elongated slot therein, a bearing carried by said control member and movable along said slot, a latch pivotally supported by said bearing, means normally maintaining said latch in engagement with said actuating element whereby to maintain said bearing adjacent one end of said slot to move said control member from said first to said second position during movement of said drive member in one direction, a release member pivotally supported by said bearing, means operable by said drive member during movement in said one direction and after movement of said control member to said second position for causing said release member to disengage said latch and to return said control member to said first position, selectively settable means for causing said release member to move out of the path of said last-mentioned means upon movement of said control member to said second position, said actuating element being adapted to directly move said control member to said first position during movement of said drive member in the opposite direction, and a second selectively settable means for causing said release member to disengage said latch before movement of said drive member in said one direction.

12. In a calculating machine, the combination with differential actuators and accumulator elements normally out of cooperative relation with said actuators, of means including a control member movable from a first position to a second for moving said accumulator elements into cooperative relation to said actuators; a rockable drive member, a rockable actuating element, said actuating element being rockable by said drive member in a direction opposite to the direction of movement of said drive member, said actuating element having an elongated slot therein, a bearing carried by said control member and movable along said slot, a latch pivotally supported by said bearing, means normally maintaining said latch in engagement with said actuating element whereby to maintain said bearnig adjacent one end of said slot to move said control member from said first to said second position during movement of said drive member in one direction, a release member pivotally supported by said bearing, means operable by said drive member during movement in said one direction and after movement of said control member to said second position for causing said release member to disengage said latch and to return said control member to said first position, and selectively settable means for causing said release member to disengage said latch before movement of said drive member in said one direction.

References Cited in the file of this patent

UNITED STATES PATENTS

| Number | Name | Date |
|---|---|---|
| 1,192,629 | Hawley | July 25, 1916 |
| 1,567,575 | Cunningham | Dec. 29, 1925 |
| 1,627,394 | Lasker et al. | May 3, 1927 |
| 2,141,269 | Ewald et al. | Dec. 27, 1938 |
| 2,203,533 | Landsiedel | June 4, 1940 |
| 2,218,108 | Harmon | Oct. 15, 1940 |
| 2,222,373 | Rauh | Nov. 19, 1940 |
| 2,270,460 | Mehan | Jan. 20, 1942 |
| 2,307,669 | Crosman | Jan. 5, 1943 |
| 2,345,685 | Rhein | Apr. 4, 1944 |
| 2,382,228 | Howell | Aug. 14, 1945 |
| 2,506,337 | Boyden | May 2, 1950 |
| 2,527,859 | Veltman et al. | Oct. 31, 1950 |
| 2,580,031 | Liljestrom | Dec. 25, 1951 |
| 2,648,497 | Boyden | Aug. 11, 1953 |